Figure 1B:
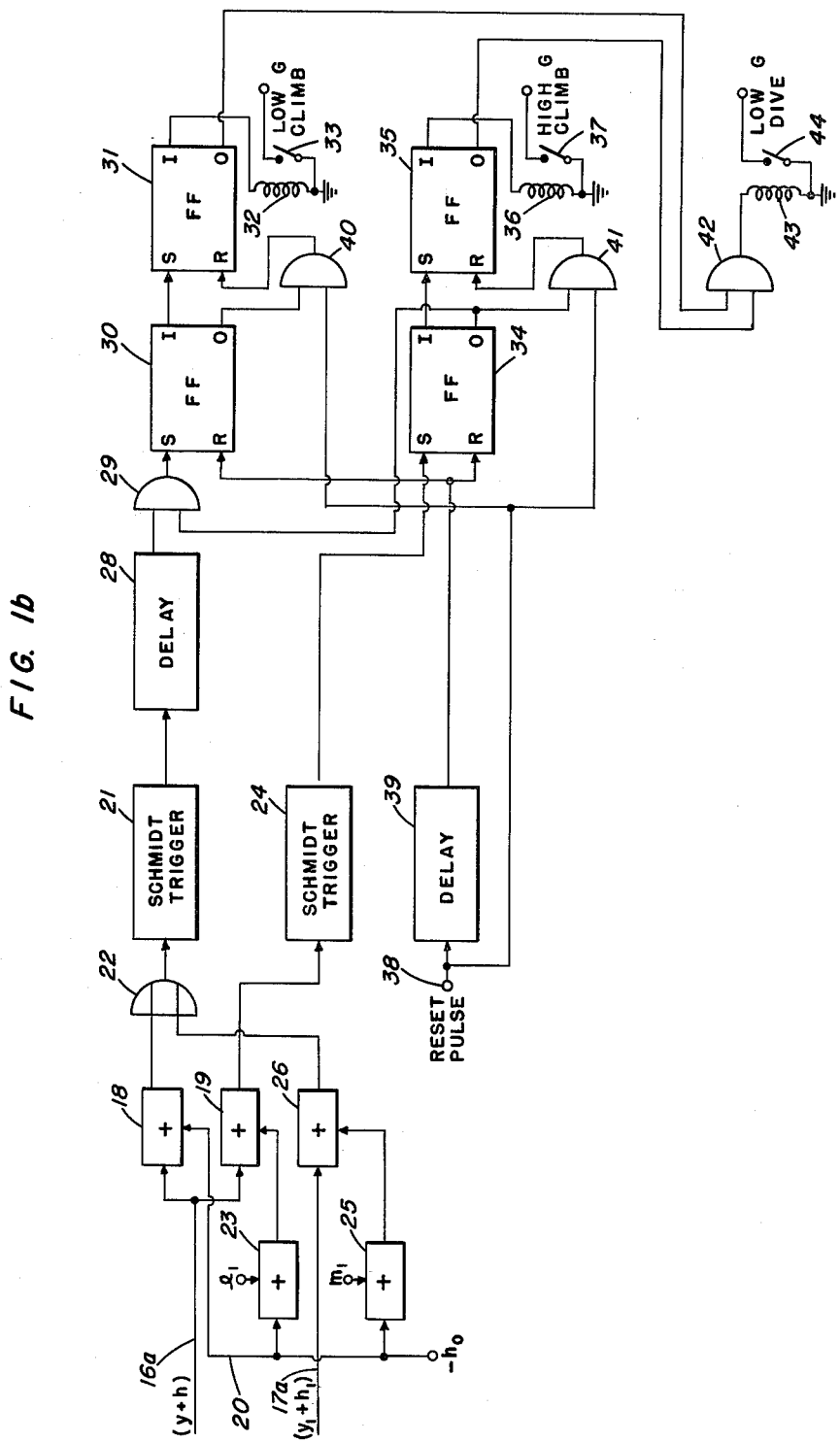

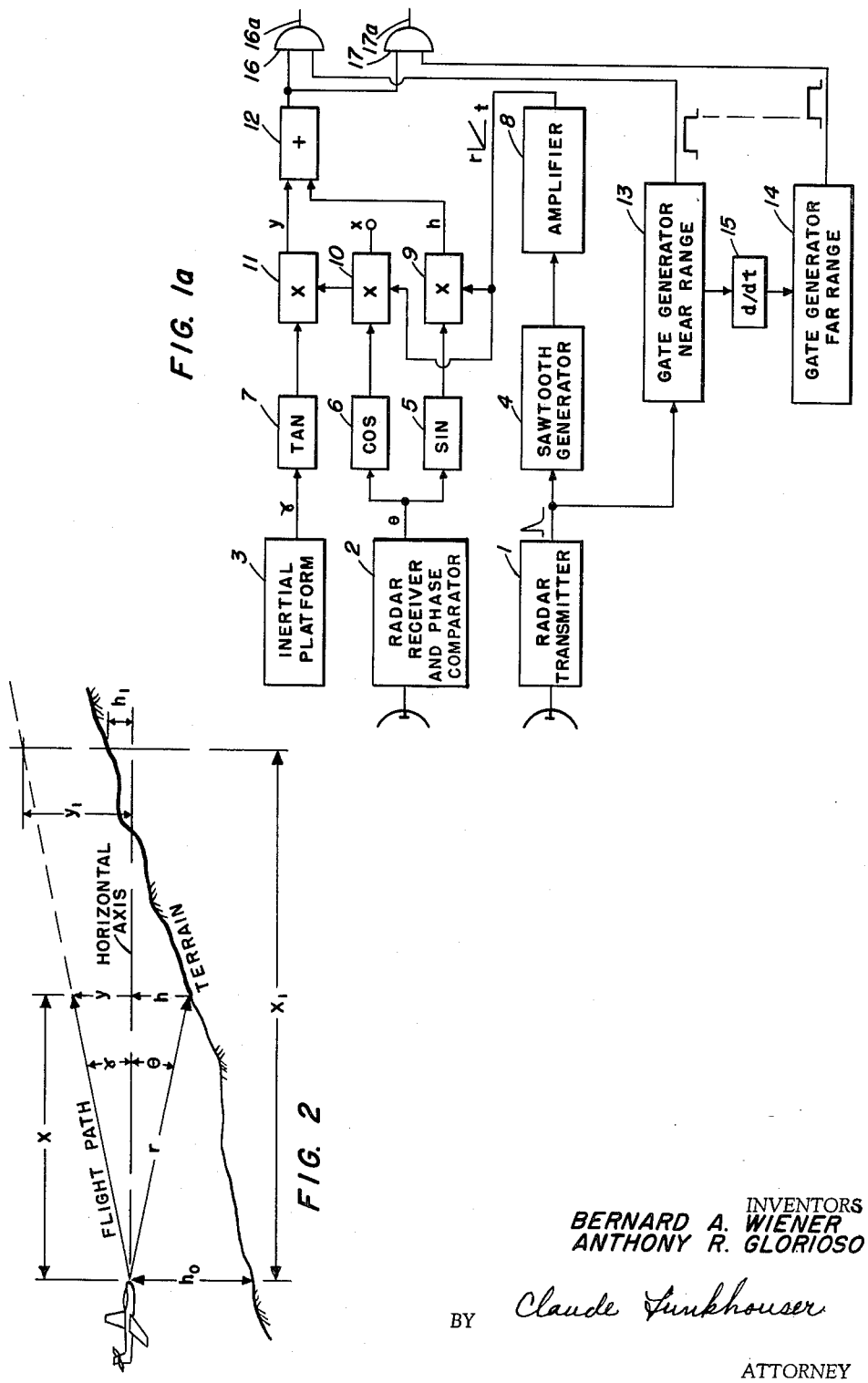

United States Patent Office 3,209,353
Patented Sept. 28, 1965

3,209,353
TERRAIN CLEARANCE COMPUTER CIRCUIT
Bernard A. Wiener, 2428 39th Place NW., Washington, D.C., and Anthony R. Glorioso, 404 Hannes St., Silver Spring, Md.
Filed Sept. 26, 1962, Ser. No. 227,119
9 Claims. (Cl. 343—7)
(Granted under Title 35, U.S. Code (1952), sec. 266)

The invention described herein may be manufactured and used by or for the Government of the United States of America for governmental purposes without the payment of any royalties thereon or therefor.

The present invention relates to a terrain avoidance system and more particularly to airborne computer circuitry for processing radar video signals to control and maintain an aircraft at a pre-set clearance altitude above the terrain.

It is anticipated that it may be necessary to conduct certain flights, particularly military flights, at relatively low altitudes and at particularly high speeds. There may be several reasons for these flights as, for example, to avoid radar detection during flights over enemy territory or to maintain visual contact with the terrain for navigational or surveillance purposes. Flights of this nature give rise to certain dangers which jeopardize the safety of the aircraft. Obviously the most critical danger is represented by land obstacles which project upwardly into the flight path. It is therefore necessary in many instances to abruptly alter the line of flight of the aircraft to safely avoid these obstacles.

It has been proposed to electronically display a profile of the terrain immediately ahead of the aircraft to indicate to the pilot that terrain avoidance tactics should be initiated. Even under the most favorable conditions however, the demands of attention and control manipulation would be most taxing on the pilot, particularly in high speed flight. In order to insure complete safety in flights at low altitudes, it is considered necessary to automatically control the aircraft to avoid all land obstacles which interfere with level flight. Systems of this nature proposed in the past have been found to be unduly complex and unreliable when confronted with some rather common terrain profiles. In addition, it was found that installation of these proposed systems in existing aircraft required extensive alteration of associated airborne equipment.

It is an object of the instant invention to provide a terrain clearance system which automatically controls an aircraft to fly at a predetermined altitude above the terrain.

It is a further object to provide an airborne terrain avoidance system to anticipate terrain obstacles which endanger safe flight and to automatically alter the flight path to avoid such obstacles.

A still further object is to provide computer circuitry for use in an airborne terrain clearance system which automatically and selectively controls the flight of an aircraft in accordance with the nature of the terrain obstacle encountered, the speed of the aircraft and the range of the aircraft from the obstacle.

An additional object is to provide an airborne terrain clearance system which is less complex and more reliable than systems heretofore known and which can be incorporated in existing aircraft without displacing and disrupting existing airborne equipment.

With these and other objects in view, as will hereinafter more fully appear, and which will be more particularly pointed out in the appended claims, reference is now made to the following description taken in connection with the accompanying drawings in which:

FIGS. 1a and 1b, when combined end to end, represent a circuit diagram, mostly in block form, of the computer circuitry employed in the present invention;

FIG. 2 is a diagram depicting an aircraft in flight, the terrain profile and the geometric relationship therebetween.

The function of the invention to be described is to determine the nature of the terrain profile from a few hunderd feet to several miles ahead of the aircraft by utilizing information derived by search radar systems found on existing aircraft. The video signals received by this airborne radar equipment contains, implicitly, the terrain altitude as a function of range. The computer circuitry processes these video signals in logic circuits to derive control signals which energize conventional auto-pilot systems to maneuver the aircraft to avoid terrain obstacles and to automatically achieve terrain clearance.

A most important feature of the instant invention is provided by electronically dividing the terrain profile scanned by the radar into two parts, the near-range zone for ranges up to one mile and the far-range zone for ranges between one mile and perhaps four miles. In the event the search radar detects a terrain obstacle in the near-range zone, the instant invention controls the auto-pilot to execute a high-G climb or a low-G climb depending on the particular flight parameters and the character of the obstacle. The instant invention also energizes the auto-pilot to cause the aircraft to execute a low-G push-over if the flight path exceeds a predetermined altitude above the terrain and conversely a climb if the flight path is below a predetermined altitude. It can be seen that the invention functions to achieve not only terrain obstacle avoidance but, in addition, automatic terrain clearance as in radar altimeter controlled flight. Video signals received from the terrain profile in the far-range zone may indicate the necessity to institute early climb maneuvers in order to successfully negotiate the terrain in this zone.

Turning now to FIG. 1a of the drawings, there is shown a radar transmitter 1, a radar receiver and phase comparator 2 and an inertial platform 3, all of which are standard equipment in certain existing aircraft. The radar transmitter emits electromagnetic radiation in the conventional manner and simultaneously triggers sawtooth generator 4 to produce a sawtooth pulse which represents range as a function of time. The radar receiver and phase comparator 2, which may be of any well known configuration, such as that embodied in Patent No. 2,630,283, issued Mar. 3, 1953, or in Patent No. 2,499,349, issued Mar. 7, 1950 receives the reflected video signals and produces an output signal which is proportional to the elevation angle $\theta$ of the video signal as shown in FIG. 2. This output signal is fed jointly to analog networks 5 and 6 which produce output signals proportional to sin $\theta$ and cosine $\theta$, respectively. The intertial platform 3 which may be a component of any well known inertial guidance system as described in the McGraw-Hill Encylopedia of Science and Technology, vol. 7, p. 91, copyright 1960, or as defined in Air Force Manual AFM 100–39, Communications—Electronics Terminology, Definitions, and Abbreviations, produces a signal proportional to the angle $\gamma$ which is the angle between the projected flight path vector and the horizontal as shown in FIG. 2. This signal is fed to analog network 7 which produces an output signal proportional to the tangent of the angle $\gamma$. It may be noted that angles $\theta$ and $\gamma$ may occur anywhere within the range of 0° to 90°.

The output signal from sawtooth generator 4, which represents the range as a function of time, is amplified by amplifier 8 to obtain the correct scaling and fed jointly to analog networks 9 and 10. These analog networks multiply the scaled sawtooth voltage with the signals, sin $\theta$ and cos $\theta$, from networks 5 and 6 to produce output signals proportional to the vertical distance $h$ between a horizontal line through the aircraft and the particular point on the terrain profile in question and an output signal proportional to the horizontal distance $x$ from the aircraft to that point on the terrain profile, respectively. The output signal $x$ from analog network 10 is fed to analog network 11 to be multiplied by the signal tan $\gamma$ from the network 7 to produce an output signal $y$ which is proportional to the vertical distance between the horizontal and the projected flight path vector at the point directly over the particular point on the terrain profile in question. The arithmetic computations performed by these analog networks can be set out as follows:

$h = r \sin \theta$, $h$ is positive below horizontal,
$x = r \cos \theta$,
$y = x \tan \gamma$, $y$ is positive above horizontal;

while the physical distances represented by these signals are shown in FIG. 2.

The outputs $h$ and $y$ from analog networks 9 and 11, respectively, are adden in summing network 12 to produce an output signal $y+h$ proportional to the altitude of the projected flight path vector above the point on the terrain profile in question. The pulse from radar transmitter 1 which triggers sawtooth generator 4 is also fed to gate generator 13 for producing an output pulse time positioned to occur coincidentally with all range signals included in the near-range zone which, in FIG. 2, can be considered as having an upper range limit equal to $x$. Gate generator 14 is triggered by gate generator 13 through differentiator 15 to produce an output pulse time positioned to occur coincidentally with all range signals in the far-range zone which, in FIG. 2, includes the ranges $x_1-x$ inclusive. The output signal $y+h$ is fed jointly to "and" gates 16 and 17 and passed through one or the other of these gates by the coincidence application of the enabling pulses from gate generators 13 and 14, respectively, depending upon whether the particular point on the terrain profile under observation by the search radar is in the near-range or the far-range zone.

The ouptut signal $y+h$ for the near-range zone from gate 16 is fed over line 16a to summing circuits 18 and 19, as shown in FIG. 1b. The summing circuit 18 is provided with a second input signal $-h_0$ on line 20 which represents the analog value of a pre-set clearance altitude which is added to the input signal $y+h$ to produce an output signal which is fed to the Schmidt trigger 21 through "or" gate 22. The signal $-h_0$ on line 20 is also fed to summing circuit 23 along with an input signal $l$, which is proportional to a constant $K_1$ times the analog value of the aircraft velocity. The output signal from summing circuit 23 is combined with the signal passed by gate 16 in summing circuit 19 to provide a triggering signal which is coupled to Schmidt trigger 24. The signal $-h_0$ on line 20 is also combined with an input signal $m_1$, which is proportional to a constant $K_2$ times the analog value of the aircraft velocity and therefore similar to input signal $l_1$, in summing circuit 25. The output signal $y_1+h_1$ in the far-range zone is similar to signal $y+h$ in the near-range zone and is passed by gate 17 where it is combined with the output signal from summing circuit 25 in summing circuit 26 to produce an output signal which is fed to Schmidt trigger 21 through "or" gate 22.

The output signal from Schmidt trigger 21 is delayed in delay network 28 and then fed through "and" gate 29 to set flip-flop 30, which in turn sets flip-flop 31. The flip-flop 31 while in the set condition produces an output which energizes relay 32 to close switch contacts 33 in the auto-pilot system causing the aircraft to execute a low-G climb. The output signal from Schmidt trigger 24 is fed directly to flip-flop 34 to set the latter which in turn flips flip-flop 35 to the set condition producing an output which energizes relay 36 to close relay contacts 37 in the auto-pilot system causing the aircraft to execute a high-G climb.

A reset pulse which coincides with the beginning of each radar scan is applied to terminal 38 and after being delayed in delay network 39 is fed to the reset input terminals of flip-flops 30 and 34. This reset is also fed directly to "and" gates 40 and 41 having outputs which are connected to the reset input terminals of flip-flops 31 and 35, respectively. Flip-flop 30 while in the reset condition produces the second input to "and" gate 40 thus permitting flip-flop 31 to be reset only when flip-flop 30 is in the reset condition. In a similar manner, flip-flop 34 while in the reset condition enables gate 41 thus permitting flip-flop 35 to be reset. The reset output of flip-flop 34 is also fed to "and" gate 29 thus permitting flip-flop 30 to be set by the output of this "and" gate only in the event that flip-flop 34 is in the reset condition. The reset outputs of flip-flops 31 and 35 are each fed to "and" gate 42 to energize relay 43 in the event that both of these flip-flops are in the reset condition. Relay 43 operates relay contacts 44 in the auto-pilot system to cause the aircraft to execute a low-G push-over or dive.

In discussing the operation of the instant invention it will be noted that the computer circuitry performs certain computations in order to determine if the projected flight path vector is above or below the pre-set clearance altitude for every point along the terrain profile in both the near-range and far-range zones and to produce auto-pilot command signals for controlling the aircraft to fly over the terrain profile at the pre-set clearance altitude. Consider first the case where the terrain in the near-range zone is such that a low-G climb if executed by the aircraft would adequately clear the terrain in this region. This is accomplished by adding the output signal $y+h$ for all points along the terrain profile within the near-range zone to the $-h_0$ signal which is the analog value of the pre-set clearance altitude appearing on line 20 in the summing circuit 18. If the result of this computation is negative at any range within this region the vertical distance from the projected flight path vector to the terrain at that particular angle is less than the predetermined clearance altitude and the output signal will energize Schmidt trigger 21 through "or" gate 22. The Schmidt trigger 21 output signal after being delayed in delay network 28 passes through gate 29 to set flip-flops 30 and 31 thereby energizing relay 32 to cause the auto-pilot system to execute a low-G climb. If however, the output signal from summing network 18 is positive, meaning that the signal $y+h$ is greater than the predetermined clearance altitude $h_0$, the Schmidt trigger 21 will not be energized. Consider next the case where the terrain in the near-range region is such that a low-G climb maneuver will not be sufficient to enable the aircraft to clear the terrain and a high-G climb is necessary. When the terrain ahead is high, $y+h$ is small and may be negative. A limiting feature is incorporated in the circuit such that, if it is necessary to execute a high-G climb in order to successfully negotiate the terrain ahead, the high-G climb command signal takes precedence over the low-G climb command signal. This is accomplished by adding the $-h_0$ signal on line 20 to the signal $l_1$, which is proportional to a constant $K_1$ times the aircraft velocity and varies inversely thereto, in summing network 23. The output from the summing network 23 is added to the signal $y+h$ in summing network 19 and if the result of this computation is negative, Schmidt trigger 24 will be energized. It will be appreciated that by this operation, the clearance altitude signal is effectively adjusted and made less negative thereby coming into play only if the signal $y+h$ is small in magnitude or negative The output form Schmidt trigger 24 sets flip-flop 34 which in turn sets flip-flop 35 thereby energizing relay 36 to cause the auto-pilot to initiate a high-G climb. Because of the delay network 28 in the output in Schmidt trigger 21, the high-G climb command signal will take precedence over the low-G climb command signal since flip-flop 34 will be set before flip-flop 30 thereby removing the enabling voltage at the reset output terminal of flip-flop 34 from the gate 29. Correspondingly if the output from summing circuit 19 is positive the Schmidt trigger 24 will not be energized and the low-G climb command signal will be passed through gate 29 activating the auto-pilot system to perform a low-G climb maneuver.

Information regarding the terrain profile in the far-range region is contained in the output of gate 17 which allows the system to anticipate more distant high terrain so that a low-G climb maneuver can be initiated soon enough to successfully negotiate distant terrain obstacles. In order to accomplish this, the signal $-h_0$ on line 20 is added to a signal $m_1$, which like the signal $l_1$ is proportional to a constant, such as $K_2$ times the aircraft velocity and varies inversely thereto, in summing network 25; the output of which is added to the signal $y+h$ in summing network 26. If the output is negative, Schmidt trigger 21 will be energized initiating a low-G climb command signal as outlined above.

The reset pulse applied to terminal 38 occurs at the beginning of each radar scan cycle and is coupled to the reset inputs of flip-flops 31 and 35 through "and" gates 40 and 41, respectively. This reset pulse is effective to reset flip-flops 31 and 35 only if flip-flops 30 and 34 are in the reset condition thus enabling gates 40 and 41. This reset pulse is also connected to delay circuit 39 which delays the pulse for a period of time equal to one-half of a radar scan cycle before being applied to the reset terminals of flip-flops 30 and 34. A complete radar scan cycle is considered to include two complete traversals of the terrain profile lying ahead of the aircraft by the radar beam. Assuming that flip-flops 30 and 34 are in their reset condition, the reset pulse will pass through "and" gates 40 and 41 at the beginning of a scan cycle and rest flip-flops 31 and 35. At some time during the first half scan cycle an auto-pilot command signal will set either flip-flop 30 or flip-flop 34 which in turn sets either flip-flop 31 or flip-flop 35 thereby energizing the auto-pilot system. At the end of the first half of the radar scan cycle, the delayed reset pulse resets the flip-flop which was previously set by a climb command signal leaving either flip flop 31 or 35 in a set condition thereby storing the auto-pilot command signal for the second half of the radar scan cycle. As the radar beam scans back over the same terrain during the second half of the scan cycle, if the projected line of flight at that instant is still below the pre-set clearance altitude at any point along the terrain profile either flip-flop 30 or 34 will again be set by a climb command signal. At the beginning of the succeeding scan cycle flip-flop 31 or 35 will not be reset since either flip-flop 30 or flip-flop 34 is in the set condition. By this arrangement, the auto-pilot command signal will be stored in the appropriate flip-flop 31 or 35 throughout this scan cycle. At such time as the projected flight path exceeds the minimum clearance altitude at all points along the terrain profile neither flip-flop 30 or 34 will be set and at the initiation of the next scan cycle the reset pulse will reset flip-flop 31 or 35 thereby terminating the climb maneuver. If, in succeeding radar scan cycles, neither flip-flop 31 or 35 is set, it can be seen that the projected line of flight exceeds the minimum clearance altitude set by the signal $-h_0$. In this event the reset output signals from these flip-flops are gated through "and" gate 42 to energize relay 43 and the auto-pilot system is activated to initiate a low-G push-over to bring the plane down to the minimum prescribed altitude.

It should be appreciated that the instant invention can be employed with any of the various types of radar equipment known in the art. Obviously many modifications and variations are possible in the light of the above teachings. It is therefore to be understood, that within the scope of the appended claims, the invention may be practiced otherwise than as specifically described.

What is claimed is:

1. A terrain clearance system for processing information signals received by a radar system and an inertial platform to produce auto-pilot command signals comprising:

electronic circuit means responsive to said information signals for deriving an output signal proportional to the height of the projected flight path above the terrain profile as a function of range, electronic gating means for separating said output signal into near-range and far-range signals, summing networks for comparing said near-range and said far-range signals with a pre-set clearance altitude signal, circuit means responsive to said summing networks for developing auto-pilot command signals to control the aircraft to fly over the terrain at the pre-set clearance altitude.

2. In a aircraft, an automatic terrain clearance system for processing information signals derived from airborne radar equipment and an inertial reference platform to produce auto-pilot command signals comprising:

analog circuit means responsive to said radar equipment and said inertial reference platform for deriving output signals proportional to the instantaneous altitude of the projected flight path vector above the terrain as a function of range, a first summing circuit for comparing said altitude signal with a pre-set clearance altitude signal, a second summing circuit for comparing said altitude signal with an adjusted clearance altitude signal which varies in accordance with the aircraft velocity, a first generator responsive to said first summing circuit for developing a low-G climb command signal in the event said pre-set clearance altitude signal exceeds said altitude, and a second generator responsive to said second summing circuit for developing a high-G climb command signal in the event said adjusted clearance altitude signal exceeds said altitude signal.

3. The automatic terrain clearance system as claimed in claim 2 which further includes means responsive to said high-G climb command signal for inhibiting said low-G climb command signal.

4. The automatic terrain clearance system as claimed in claim 3 wherein said low-G climb command signal inhibiting means includes:

a first flip-flop responsive to said low-G climb command signal, a second flip-flop responsive to said high-G climb command signal, a gate circuit coupling said low-G climb command signal to said first flip-flop, delay means interposed between said first generator and said gate circuit for delaying said low-G climb command signal, and circuit connection means between said second flip-flop and said gate circuit for disabling said gate circuit upon operation of said second flip-flop in response to said high-G climb command signal.

5. In an aircraft, a terrain clearance system for processing information signals derived by an airborne search radar system and an inertial reference platform to develop auto-pilot command signals comprising:

a sawtooth generator responsive to said radar system for generating a signal proportional to range as a function of time, first analog circuit means responsive to said radar system for developing output signals proportional to the sine and the cosine of the elevation angle of the radar return signal beam, second analog circuit means responsive to said inertial reference platform for developing output signals proportional to the tangent of the angle between the projected flight path vector and the horizontal, arithmetic circuit means responsive to said first and second analog circuit means and said sawtooth generator for developing output signals proportional to the altitude of the projected flight path vector as a function of range, a near-range gate pulse generator triggered by said radar system, a far-range gate pulse generator triggered by said radar system, gating means responsive to said near-range and said far-range gate pulse generators and said arithmetic circuit means for sorting said altitude signals into near-range altitude signals and far-range altitude signals, a first summing circuit for comparing said near-range altitude signal to a pre-set clearance altitude signal, a second summing circuit for comparing said far-range altitude signal to said pre-set clearance altitude signal, a first Schmidt trigger responsive to said first and second summing circuits when said pre-set clearance altitude signal is greater in magnitude than either said near-range or said far-range altitude signal to produce a low-G climb command signal, a delay network for delaying said low-G climb command signal, first and second flip-flop circuits responsive to said delayed low-G climb command signal for energizing said auto-pilot to execute a low-G climb maneuver, a third summing circuit for comparing said near-range altitude signal to said pre-set clearance altitude signal adjusted in accordance with the velocity of the aircraft, a second Schmidt trigger responsive to said third summing circuit for developing a high-G climb command signal when said adjusted pre-set clearance altitude signal exceeds said near-range altitude signal, third and fourth flip-flop circuits responsive to said high-G climb command signal for energizing said auto-pilot to execute a high-G climb maneuver, gate means coupled to said first and third flip-flop to arrest said low-G climb command signal in the event a high-G climb command signal has been generated, reset circuit means for resetting said first and third flip-flop circuit once each radar scan cycle and for resetting said second and fourth flip-flop only in the absence of climb command signals, and gating means responsive to said second and fourth flip-flop circuits for developing a low-G dive command signal in the event no climb command signals were generated in the previous radar scan cycle.

6. A method for achieving automatic terrain clearance in aircraft flight comprising the steps:

generating a signal proportional to the instantaneous altitude of the projected flight path vector above the terrain as a function of range, sorting said instantaneous altitude signals into near-range and far-range altitude signals, comparing said near-range and far-range altitude signals with a pre-set clearance altitude signal, generating a climb command signal when said pre-set clearance altitude signal exceeds either said near-range altitude signal or said far-range altitude signal.

7. A method for achieving automatic terrain clearance in aircraft flight comprising the steps:

generating a signal proportional to the instantaneous altitude of the projected flight path above the terrain as a function of range, sorting said instantaneous altitude signal into near-range and far-range altitude signals, comparing said near-range and said far-range altitude signals with a pre-set clearance altitude signal, generating a low-G climb command signal when said pre-set clearance altitude signal exceeds either said near-range or said far-range altitude, adjusting said pre-set clearance altitude signal in accordance with the velocity of the aircraft, comparing said near-range altitude signal with said adjusted pre-set clearance altitude signal and generating a high-G climb command signal when said adjusted pre-set clearance signal exceeds said near-range altitude signal.

8. The method as claimed in claim 7 which further includes the step of inhibiting said low-G climb command signal in the event said high-G climb command signal is generated.

9. The method as claimed in claim 8 which further includes the step of generating a low-G dive in the event no climb command signals are generated.

References Cited by the Examiner

UNITED STATES PATENTS 2,965,894  12/60  Sweeney _____ 343—7
3,028,592   4/62  Parr et al _____ 343—9

CHESTER L. JUSTUS, *Primary Examiner.*